(12) United States Patent
Nagashige

(10) Patent No.: US 7,202,960 B2
(45) Date of Patent: Apr. 10, 2007

(54) PRINT SHEET ORIGINAL AUTHENTICATION SYSTEM, PRINTER DEVICE AND CHECKING DEVICE

(75) Inventor: Tsutomu Nagashige, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 796 days.

(21) Appl. No.: 10/150,069

(22) Filed: May 20, 2002

(65) Prior Publication Data

US 2002/0171862 A1 Nov. 21, 2002

(30) Foreign Application Priority Data

May 21, 2001 (JP) ............................. 2001-151619

(51) Int. Cl.
*G06F 15/00* (2006.01)
*G06F 17/50* (2006.01)
(52) U.S. Cl. .................. 358/1.14; 358/1.14; 705/7
(58) Field of Classification Search ............... 358/1.14, 358/1.16; 715/738; 455/566, 161.3, 506, 455/504; 382/310, 100, 135; 705/4, 7, 10; 700/287, 286; 400/249, 208; 399/84
See application file for complete search history.

(56) References Cited

U.S. PATENT DOCUMENTS

| | | | | |
|---|---|---|---|---|
| 5,444,518 A | * | 8/1995 | Hashiguchi et al. ......... | 399/271 |
| 5,703,972 A | * | 12/1997 | Lopresti et al. ............. | 382/310 |
| 6,047,093 A | * | 4/2000 | Lopresti et al. ............. | 382/310 |
| 7,002,710 B1 | * | 2/2006 | Van Liew et al. ......... | 358/3.28 |
| 2004/0049521 A1 | * | 3/2004 | Borrowman ............. | 707/104.1 |
| 2004/0078337 A1 | * | 4/2004 | King et al. .................. | 705/51 |

FOREIGN PATENT DOCUMENTS

| | | |
|---|---|---|
| JP | 09-179494 | 7/1997 |
| JP | 10-200743 | 7/1998 |
| JP | 2001-053954 | 2/2001 |
| JP | 2001-078006 | 3/2001 |
| JP | 2001 217758 | 7/2001 |
| JP | 2002 003153 | 7/2002 |

* cited by examiner

*Primary Examiner*—King Y. Poon
*Assistant Examiner*—Saeid Ebrahimi
(74) *Attorney, Agent, or Firm*—Rabin & Berdo, P.C.

(57) ABSTRACT

An original authentication system and structural elements thereof is provided, in which it is possible to easily distinguish between an original and a copy. The checking device 13 comprises: a print sheet reading sensor 201 for reading the print pattern of the print sheet; a mark information checking portion 202 for detecting the mark information from the print pattern of the read print sheet, for checking the mark and for calculating the remaining mark amount; a generation control information detection portion 203 for detecting the generation control information of the print pattern of the read print sheet, and extracting the remaining mark amount from said generation control information; and a remaining mark amount comparison portion 204 for comparing the calculated remaining mark amount obtained by mark detection with the remaining mark amount extracted from the generation control information. A distinction can between deterioration in quality occurring when an original is printed out, and that occurring when subsequent copies are made, and thus it is possible to carry out authentication of a printed sheet as an original.

5 Claims, 16 Drawing Sheets

PRINT SHEET ORIGINAL AUTHENTICATION SYSTEM, PRINTER DEVICE AND CHECKING DEVICE

BACKGROUND OF THE INVENTION

1. Field of the Invention

The present invention relates to a system for determining whether a print sheet on which printing has been carried out is an original or a copy (this is referred to as original authentication hereinafter), and to the structural elements of this system.

2. Description of the Related Art

In recent years, various methods have been used for carrying out original authentication for materials which have been printed out. Examples of these methods include: 1. A method in which a special purpose blank printing paper is used, on which a pattern or mark appears when copying is carried out; 2. A method in which authenticating information for the printed original data is printed on the print sheet as a special mark such as a two dimensional bar code; and 3. A method in which information for certifying the original is printed as an electronic mark pattern on the entire surface of the print sheet.

Methods for embedding the electronic mark in the print sheet include the following known techniques:

Japanese Patent Application No. 2001-78006 "Embedding and Detection of Mark Information for Black and White Two-value Document Images"

Japanese Patent Application No. 2001-53954 "Information Embedding Device, Information Reading Device, Electronic Marking System, Information Reading Method and Recording Medium Japanese Patent Application Laid-Open No. 9-179494 "Secret Information Recording Method"

Japanese Patent Application Laid-Open No. 10-200743 "Document Processing Device"

The following is an example in which the originality of a print sheet is authenticated using a simplified electronic mark technique. In this example, the information for authenticating the original is incorporated as an electronic mark in the original digital data, printed by the printer device and then read by a scanner or the like. FIG. 14 shows the overall structure of the original authentication device 50 in which the electronic mark is embedded in the print sheet by the printer device, and the electronic mark pattern is read by a scanner and the like and checking is thereby carried out. FIG. 15 is a block diagram of the print data creation portion 51 and the printer device 52 of the original authentication system 50 of FIG. 14. FIG. 16 is a block diagram of the detection device 53 of the original authentication system 50 of FIG. 14.

As shown in FIG. 14, the original authentication system 50 includes the print data creation portion 51, the printer device 52, and the checking device 53. The print data creation portion 51 creates a print pattern for prints having an electronic mark inserted in the digital data. The printer device 52 outputs the print which will become the original. When the print sheet is input into the checking device 53, the information detected from the electronic marking of the print sheet is output.

As shown in FIG. 15, the print data creation portion 51 includes the original data input end 501 and the mark information creation portion 101. The original data input end 501 inputs the data that is to be printed. The mark information creation portion 101 creates the electronic mark information to be input in the original data.

As shown in FIG. 15, the printer device 52 includes: the print data input end 502; the print sheet input end 503; the printing portion 102; and the print sheet output end 504. The print data input end 502 inputs a print pattern including electronic mark information to the printer device 52. The print sheet input end 503 feeds print paper to the printer device 52. The printing portion 102 prints the print data input from the print data input end 502 on the print sheet fed in from the print sheet input end 503. The print sheet output end 504 discharges the print sheet on which printing has been carried out by the printing portion 102.

As shown in FIG. 16, the checking device 53 includes: a print paper input end 601; a print sheet reading sensor 201; a mark information checking portion 202; and a mark check result output end 602. The print paper input end 601 feeds the print sheets to be verified to the checking device 53. The print sheet reading sensor 201 scans the print sheet fed in from the print paper input end 601, and reads the pattern printed thereon. The mark information checking portion 202 checks the electronic mark of the pattern read by the print sheet reading sensor 201. The mark check result output end 602 outputs the result of the mark checking by the mark information checking portion 202.

The operation of the original authentication system 50 having the above structure will be described in the following.

At the print data creation portion 51 data is input from the original data input end 501, and at the mark information creation portion 101, electronic mark information for data is created. Both sets of data are incorporated and print data having mark information is thereby created. The electronic mark information which is inserted may be data certifying the print data, or information about time and date of creation or printing.

The print data that is created is input from the print data input end 502 to the printer device 52. At the printer device 52, print data including mark information is printed on the print sheet fed in from the print sheet input end 503, by the printing portion 102. The print sheet on which printing is carried out is discharged from the print sheet output end 504.

When the print sheet is input from the print paper input end 601, the print sheet reading sensor 201 scans the print sheet and creates a print pattern. The mark information checking portion 202 reads the mark information of the print pattern that has been created and sends the results to the mark check result output end 602.

It is to be noted that in general, when digital data is printed on print paper, deterioration in quality such as fading and the like, occurs due to various conditions such as the remaining toner amount, paper quality, humidity and the like. Because this deterioration occurs, in the method where the electronic mark information is incorporated in the digital information prior to printing, and then printed thereafter, it is difficult to determine whether the deterioration in quality occurred the time when the original was printed out (for the first time), or if the deterioration was a result of improper scanning, copying or the like. As a result determining if a print sheet was a copy or original (original authentication) was difficult.

SUMMARY OF THE INVENTION

The present invention was achieved in view of the problem of the original authentication system of the prior art described above, and the object of the present invention is to provide a new and improved original authentication system in which it is possible to easily distinguish between an original and a copy (carry out original authentication).

In an effort to solve the problems described above, according to a first aspect of the present invention, a print paper original authentication system is provided which comprises: a print data creation portion for creating print data having an electronic mark incorporated in the original data; a printer device for printing the print data on a print sheet as a print pattern; and a checking device for checking for the mark on the print sheet. The features of the printer device and the checking device are described in the following.

The printer device detects the remaining mark amount of the print pattern of the print sheet which was read, and converts this remaining mark amount to generation control information. The generation control information is then printed on the print sheet.

The checking device calculates the remaining mark amount of the print pattern of the print sheet which was read. It also detects the generation control information, and extracts the remaining mark amount from the generation control information, and then compares the calculated remaining mark amount with the remaining mark amount extracted from the generation control information.

Further, according to a second aspect of the present invention, a print paper original authentication system is provided which comprises: a print data creation portion for creating print data having electronic mark information incorporated in the original data; a printer device for printing the print data on a print sheet as a print pattern; and a checking device for checking for the mark on the print sheet. The features of the printer device and the checking device are described in the following.

The printer device comprises: a print reading sensor for reading the print pattern on a print sheet on which printing has been carried out; a remaining mark amount detection portion for detecting the remaining mark amount from a print pattern of a read print sheet; a generation control information creation portion for converting the remaining mark amount to generation control information; and a printing portion for printing the generation control information on a print sheet.

The checking device comprises: a print sheet reading sensor for reading the print pattern of the input print sheet; a mark information checking portion for detecting the mark information from the print pattern of the read print sheet, for checking the electronic mark and for calculating the remaining mark amount; a generation control information detection portion for detecting the generation control information of the print pattern of the read print sheet and extracting the remaining mark amount from the generation control information; and a remaining mark amount comparison portion for comparing the calculated remaining mark amount obtained by mark detection with the remaining mark amount extracted from the generation control information.

In the present invention "print sheet" refers to the printed paper output from the printer device. "Remaining mark amount" refers to a numerical value which indicates the extent of deterioration when digital data is printed out on a print sheet. "Generation control information" refers to identifying information for authenticating the originality of the print sheet, and is created from a combination of the remaining mark amount after the original is first printed out; the serial number of the printer, and time and date of creation.

Actual examples of methods for which it is possible to detect the remaining mark amount of electronic marks include the following.

(a) The conditions determining threshold value (for example, pattern density) are gradually changed, and the electronic mark is incorporated in the original data (for example, gradation).

(b) When printing on or scanning of the print sheet is carried out, deterioration is caused and thus reading of the mark information may be unsuccessful for some parts of the print sheet. The success rate of the reading of the mark information at this time is considered the remaining mark amount.

Alternative methods for which it is possible to detect the remaining mark amount of electronic marks include the following as well.

(a) Embedding mark information in a plurality of different frequency regions.

(b) Deterioration occurs when printing and scanning of the print sheet is carried out. Damage of the mark information is greater as the frequency region gets higher. The highest frequency component for which the mark information is successfully read is considered the remaining mark amount.

The electronic mark information using the data frequency region, breaks down the image into its frequency components by a Fourier transform. The bits of a specific frequency component portion is converted and the mark information (bit pattern) is thereby embedded.

Further, according to a third aspect of the present invention, a print paper original authentication system is provided which comprises: a print data creation portion for creating print data having electronic mark information incorporated in the original data; a printer device for printing the print data on a print sheet as an print pattern; a checking device for checking for the mark on the print sheet; and a generation control information server for sending and receiving generation control information of the print sheet between the printer device and the checking device. The features of the printer device, the checking device and the generation control information server are described in the following.

The printer device detects the remaining mark amount of the print pattern of the print sheet that was read, and converts the remaining mark amount to generation control information. The unique ID of the print sheet is linked to this generation control information and output to an external server.

The generation control information server links the ID with the generation control information and stores them.

The checking device calculates the remaining mark amount from the print pattern of the read print sheet. It also detects the ID and retrieves the generation control information from the external server, and extracts the remaining mark amount from that generation control information and then compares the calculated remaining mark amount with the remaining mark amount extracted from the generation control information.

Further, according to a fourth aspect of the present invention, a print paper original authentication system is provided which comprises: a print data creation portion for creating print data having electronic mark information incorporated in the original data; a printer device for printing the print data on a print sheet as a print pattern; a checking device for checking for the mark on the print sheet; and a generation control information server for sending and receiving generation control information of the print sheet between the printer device and the checking device. The features of the printer device, the checking device and the generation control information server are described in the following.

The printer device comprises: a print sheet reading sensor for reading the print pattern of the print sheet on which printing has been carried out; a remaining mark amount detection portion for detecting the remaining mark amount of the print pattern of the read print sheet; a generation control information creation portion for converting the remaining mark amount to generation control information; an ID creation portion for creating a unique ID for each print sheet; a printing portion for printing the ID onto the print sheet; and a generation control information output end for linking the ID with the generation control information, and outputting them to the generation control information server.

The generation control information server links the ID with the generation control information and stores them.

The checking device comprises: a print sheet reading sensor for the print pattern of the print sheet which has been input; a mark information checking portion for detecting the mark information of the print pattern on the print sheet which has been read, for checking the mark information and for calculating the remaining mark amount; an ID detection portion for detecting the ID of the print pattern which was read by the print sheet reading sensor; an ID transmission end for sending the detected ID to the generation control information server, and for requesting the retrieval of the generation control information; a generation control information receiving end for receiving generation control information corresponding to the ID sent from the generation control information server; a generation control information retrieval portion for extracting the remaining mark amount from the retrieved generation control information; and a remaining mark amount comparison portion for comparing the remaining mark amount calculated by checking the mark with the remaining mark amount extracted from the generation control information.

In the present invention, the ID is a serial number which is assigned to each and every print sheet which is to become an original. The IDs are created serially such that the same number is never assigned to the different print sheets.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The preferred embodiments of the original authentication system, the printer device and the checking device of the present invention are described in detail with reference to the accompanying drawings. It is to be noted that in the specification and drawings of the present application, the same numbers are assigned to structural elements having essentially the same functions, and thus repeated description thereof is omitted.

First Embodiment

Figure 1:
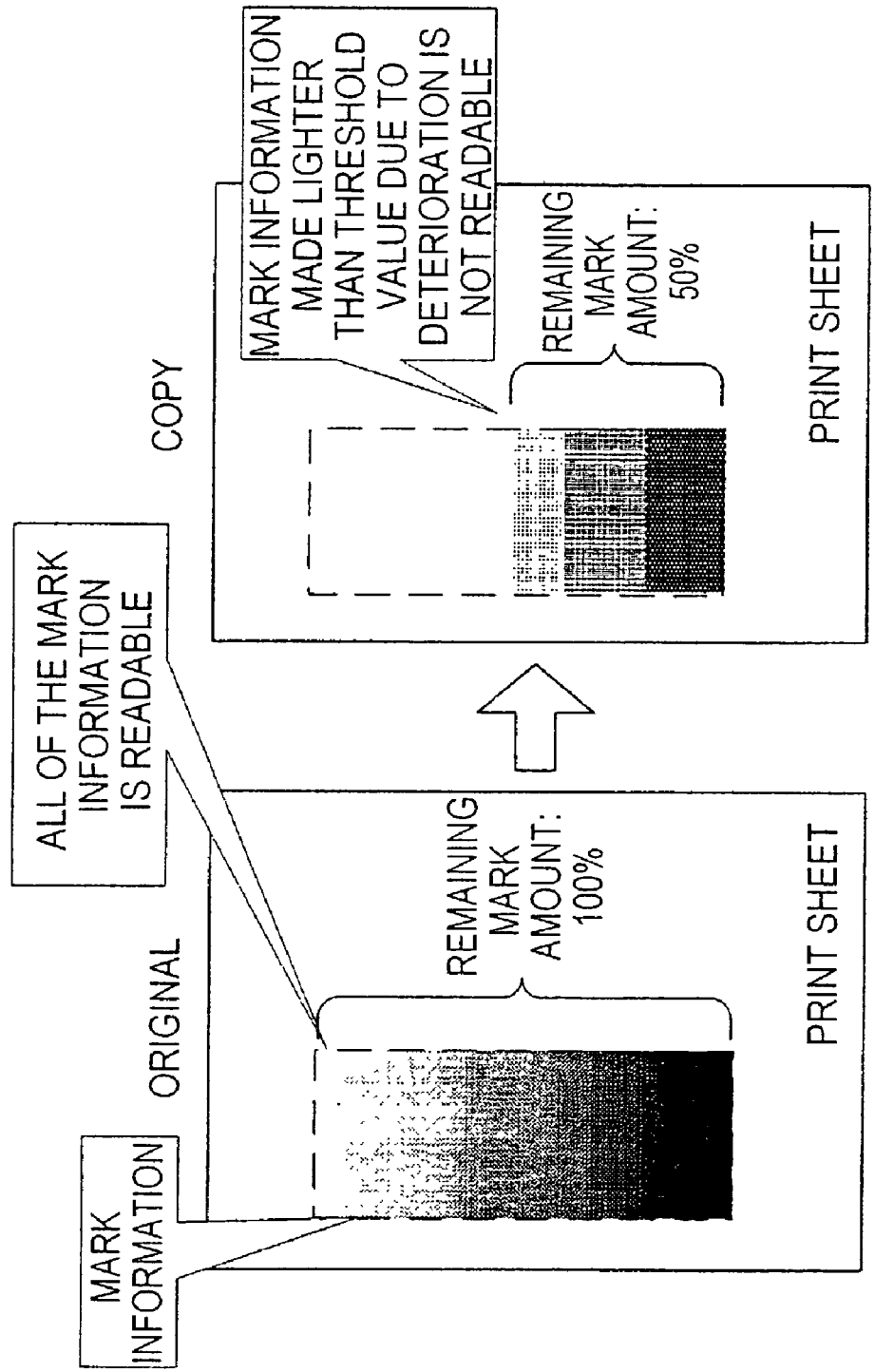
FIG. 1 is an explanatory chart showing an example of an electronic mark for which it possible to detect the mark amount remaining.
Figure 2:
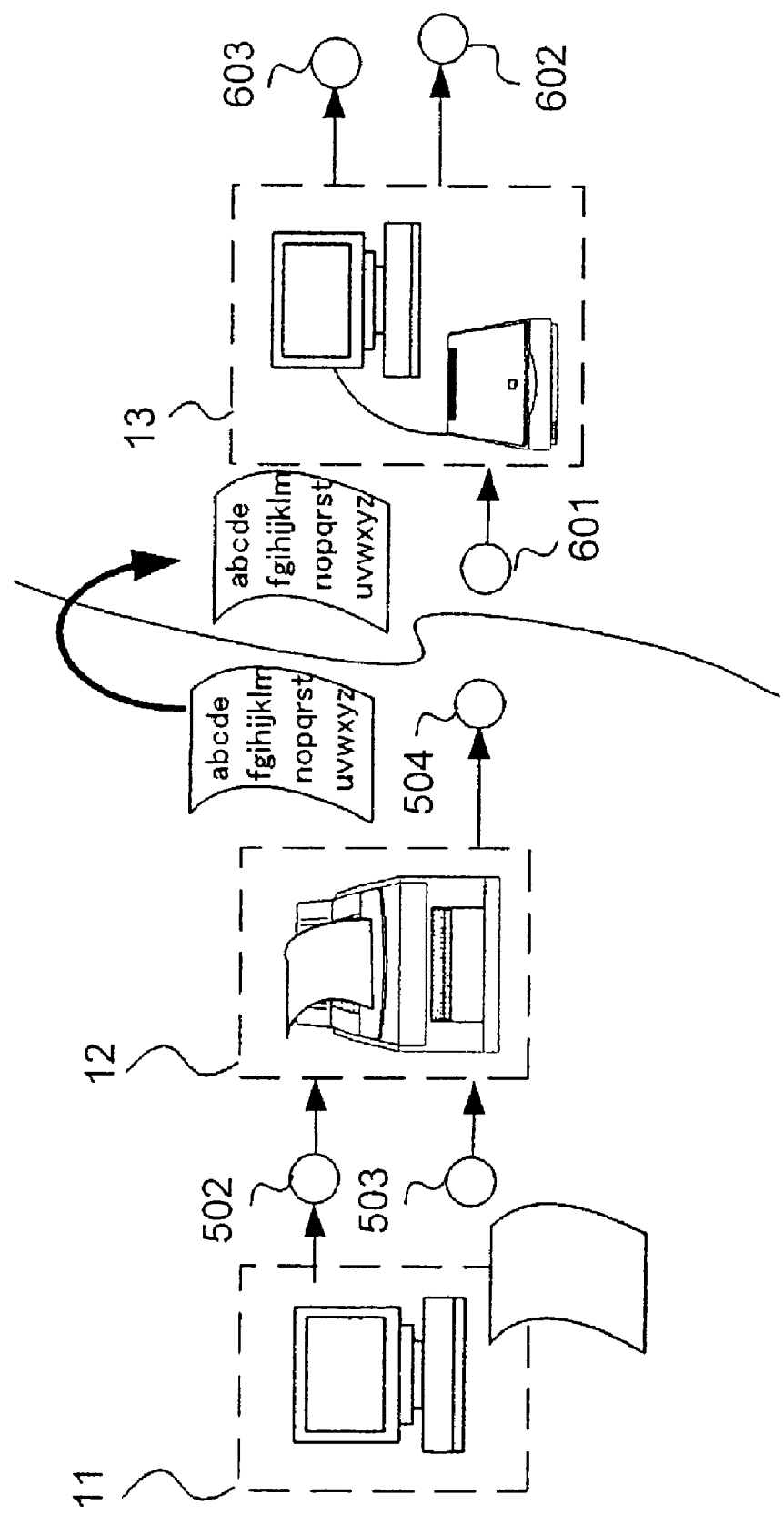
FIG. 2 is a block diagram showing the overall structure of the system of the first embodiment.
Figure 3:
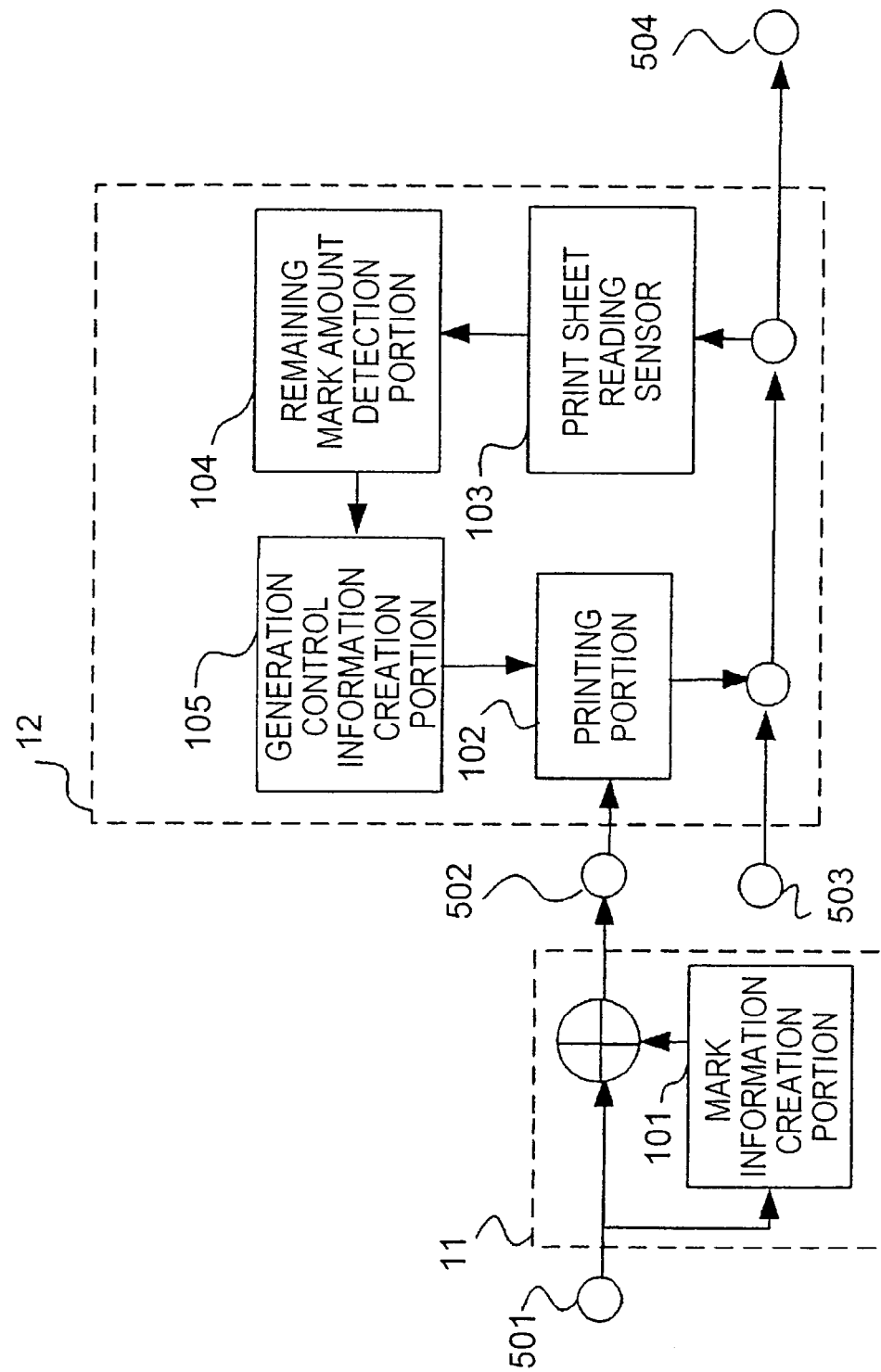
FIG. 3 is a block diagram showing the structure of the printer device of the first embodiment.
Figure 4:
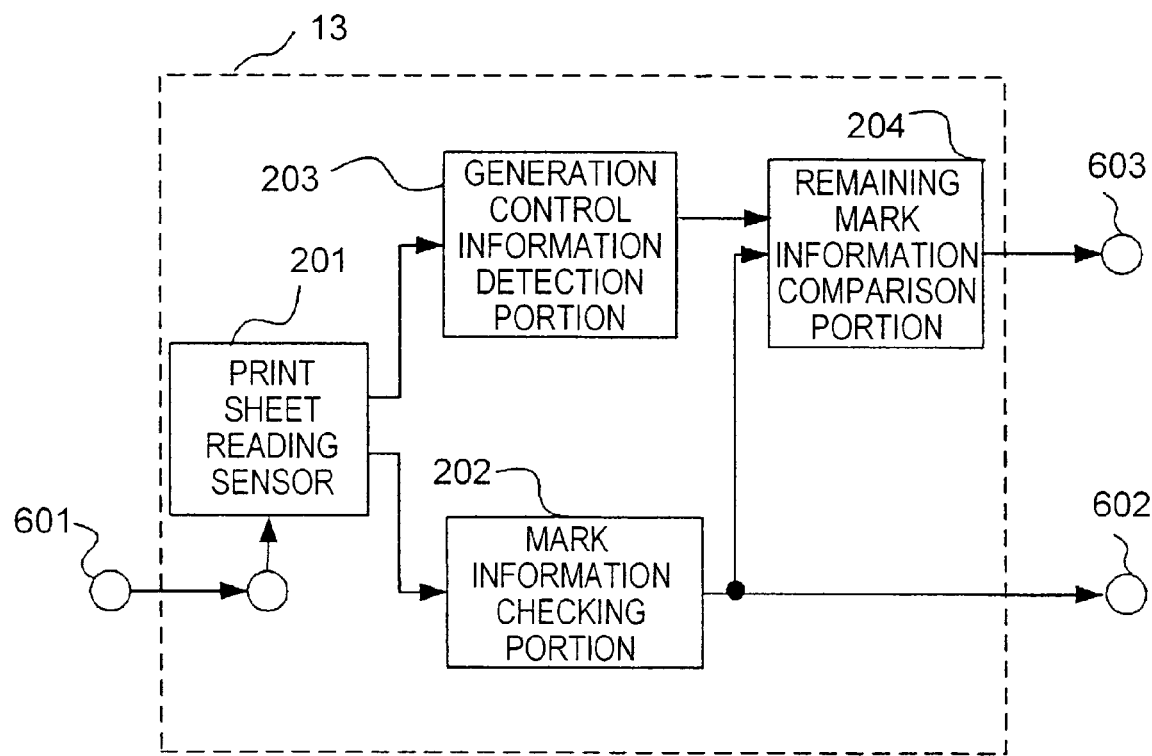
FIG. 4 is a block diagram showing the structure of the checking device of the first embodiment.

The following is a description of the first embodiment of the present invention. FIG. 2 shows the overall structure of the original authentication system 10 in which the printer device embeds an electronic mark in the print sheet, and then reading and checking of the electronic mark pattern is carried out by a scanner or the like. FIG. 3 is a block diagram showing the print data creation portion 11 and the printer device 12 of the original authentication system 10 of FIG. 2. FIG. 4 is a block diagram showing the checking portion 13 of the original authentication system 10 of FIG. 2.

As shown in FIG. 2, the original authentication system 10 comprises: print data creation portion 11; a printer device 12; and a checking device 13. The print data creation portion 11 creates print patterns for digital data having an electronic marking inserted therein. The printer device 12 outputs the print sheet which is to become the print original. When a print sheet is input to the checking device 13, the information detected from the electronic mark of the print sheet is output. Each of the structural elements of the original authentication system 10 is described in detail below.

Print Data Creation Portion 11

As shown in FIG. 3, print data creation portion 11 comprises the original data input end 501 and the mark information creation portion 101. The original data input end 501 inputs the data to be printed. The mark information creation portion 101 creates the electronic marking to be inserted in the original data.

Printer Device 12

As illustrated in FIG. 3, the printer device 12 comprises: the print data input end 502; the print sheet input end 503; the printing portion 102, the print sheet reading sensor 103; the remaining mark amount detecting portion 104; the generation control information creation portion 105; and the print sheet output end 504.

The print data input end 502 inputs a print pattern including electronic mark information to the printer device 52. The print sheet input end 503 feeds print sheets to the printer device 52. The printing portion 102 prints onto the print sheets fed in from the print sheet input end 503, print data input from the print data input end 502. In addition, the generation control information created at the generation control information creation portion 105 is printed on the print sheet. The print sheet reading sensor 103 scans the print sheet. The remaining mark amount detection portion 104 calculates the remaining mark amount from the original data scanned at the print sheet reading sensor 103. The generation control information creation portion 105 creates the generation control information from information such as remaining mark amount information obtained at the remaining mark amount detection portion 104. The print sheet output end 504 discharges the print sheet on which printing has been carried out by the printing portion 102.

In this manner, when the printer device 12 of the present embodiment outputs the print sheet which is to become the original, the generation control information is printed on the print simultaneously.

The Checking Device 13

As illustrated in FIG. 4, the checking device 13 comprises: the print sheet input end 601; the print sheet reading sensor 201; mark information checking portion 202; the generation control information detection portion 203; the remaining mark amount comparison portion 204; the mark check result output end 602; and the generation control information check result output end 603.

The print sheet input end 601 feeds the print sheets that are to be checked by the checking device 13. The print sheet reading sensor 201 scans the print sheet which has been input from the print sheet input end 601 and reads the pattern printed thereon. The mark checking portion 202 checks the electronic mark of the pattern read by the print sheet reading sensor 201. The generation control information detection portion 203 detects the generation control information printed on the print sheet. The remaining mark amount comparison portion 204 compares the remaining mark amount input from the mark information checking portion 202 with that input from the generation control information detection portion 203. The mark check result output end 602 outputs the result obtained by the mark information checking portion 202 carrying out checking of the electronic mark. The generation control information check result output end 603 determines whether the print sheet is the original or a copy as a result of the comparison carried out at the remaining mark amount comparison portion 204, and this result is output.

It is to be noted that the physical distortion that occurs when the pattern which is read at the print sheet reading sensor 201 is re-digitalized can be corrected using an OCR (Optical Character Reader) to correct the image, or alternatively the problem can be solved with software by using an electronic mark in which an incline of the image can be detected.

The original authentication system 10 having the above structure is described in the following.

At the print data creation portion 11, electronic marking information is created, and data is input from the original data input end 501. Both sets of data are incorporated into each other to thereby create print data having mark information included therein. The electronic mark information inserted may be certifying information for the original data or information on the time of printing or the like. The print data having the electronic mark pattern incorporated therein is output to the print data input end 502.

The printer device 12 operates in the following manner.

When data is input from the print data input end 502, the printing portion 502 prints print data on the print sheet input from the print sheet 503. The print sheet reading sensor 103 reads the pattern on the print sheet on which printing has been carried out. The remaining mark amount detection portion 104 detects the electronic mark of the pattern that was read, and calculates the remaining mark amount. The calculated remaining mark amount is input to the generation control information creation portion 105. At the generation control information creation portion 105, generation control information is created from the remaining mark amount and converted to a print pattern. The printing portion 102 prints the print pattern of the generation control information which was sent in, on the print sheet.

Figure 5:
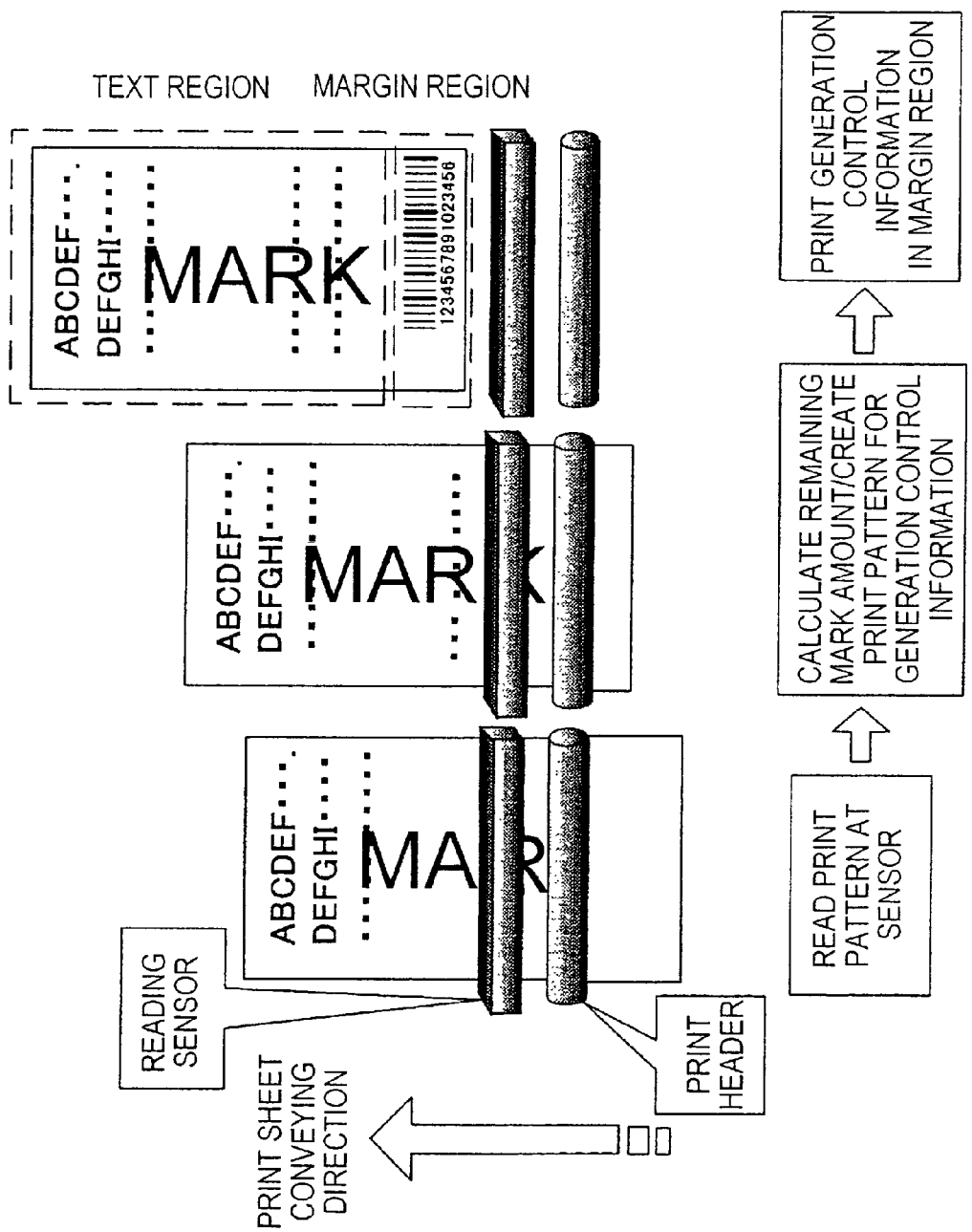
FIG. 5 is an explanatory chart showing an example of the device for printing generation control information the margin region of a print sheet.

FIG. 5 is an example of the device for printing the generation control information on the print sheet.

In the example of FIG. 5, the print sheet reading sensor is disposed so as to be adjacent to the printing head. The print sheet reading sensor scans the portion that has been printed immediately after printing is carried out. When printing in the text region (portion being data) of the printing sheet is complete, the remaining mark amount is calculated, and the print pattern of the generation control information is created. In this case, it is displayed as a barcode. The generation control information is printed in the margin region of a print sheet in response to the carry of the print sheet.

The checking device 13 operates in the following manner.

When the print sheet is input from the print sheet input end 601, the print sheet reading sensor 201 reads the print data. The print data which has been read is input into the mark information checking portion 202 and to the generation control information detection portion 203. The mark information checking portion 202 checks the electronic mark of the print data and calculates the remaining mark amount. At the generation control information detection portion 203, the generation control information is read from a specific location in the print data and the remaining mark amount of the recorded mark is retrieved. The remaining mark amount obtained from the mark information checking portion 202 and the generation control information detection portion 203 are sent to the remaining mark amount comparison portion 204 to be compared.

At the remaining mark amount comparison portion 204:

(a) If the difference between the two remaining mark amounts is not greater than a specific threshold value, the print sheet is determined to be an original, and this result is output to the generation control information check result output end 603.

(b) If the difference between the two remaining mark amounts exceeds a specific threshold value, the print sheet is determined to be a copy and not an original, and this result is output to the generation control information check result output end 603.

In addition, at the mark information checking portion 202, any result obtained by checking the mark, other than the determination as to whether or not the print sheet is an original, is output to the mark check result output end 602.

As described above, according to this embodiment, a distinction can be made between deterioration occurring when an original is printed out, and deterioration occurring when subsequent copies are made. As a result, it is possible to determine whether a print sheet on which printing has been carried out is an authentic original (distinguishing between the original and a copy).

The Second Embodiment

Figure 6:
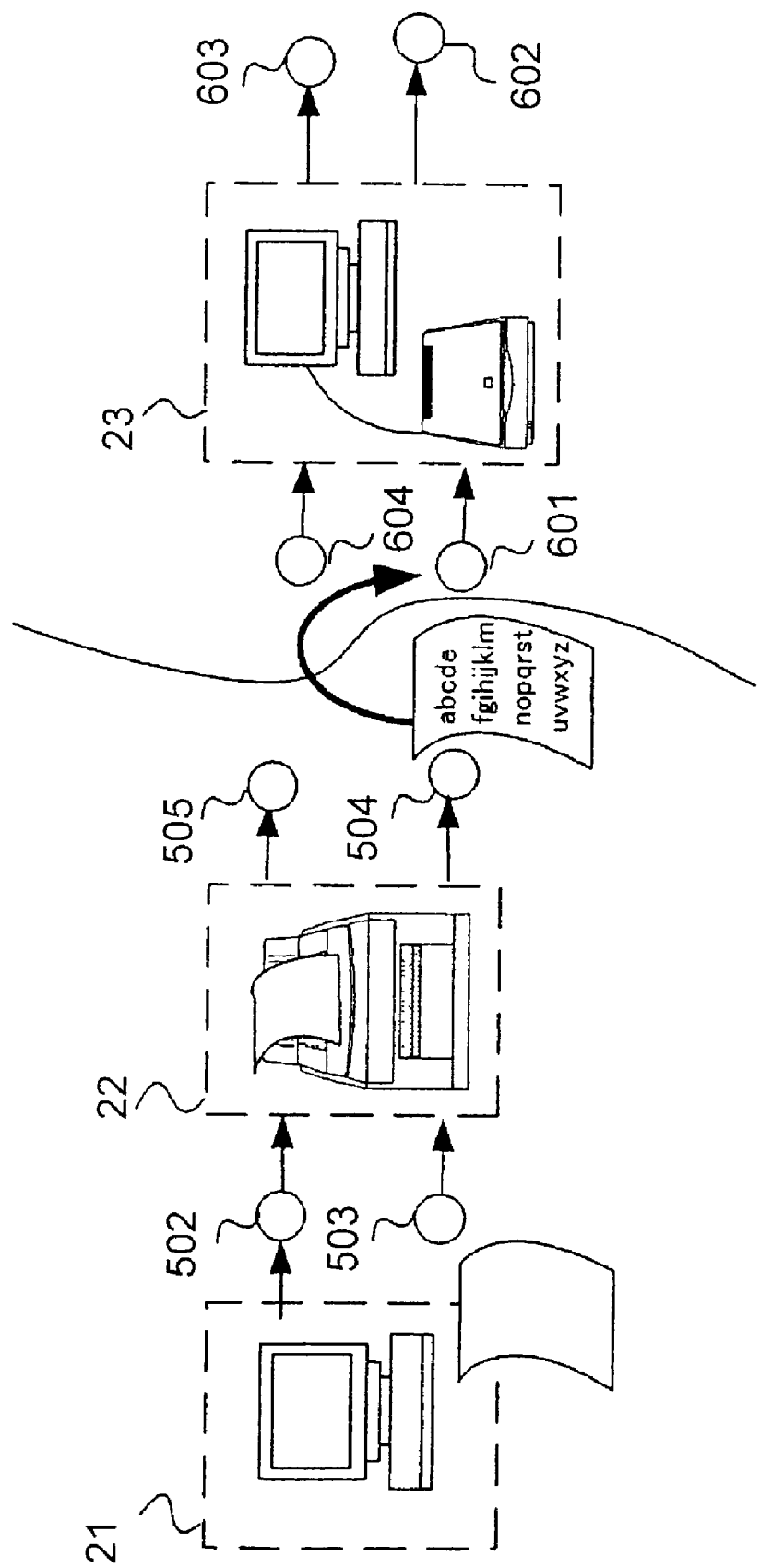
FIG. 6 is a block diagram showing the overall structure of the system of the second embodiment.
Figure 7:
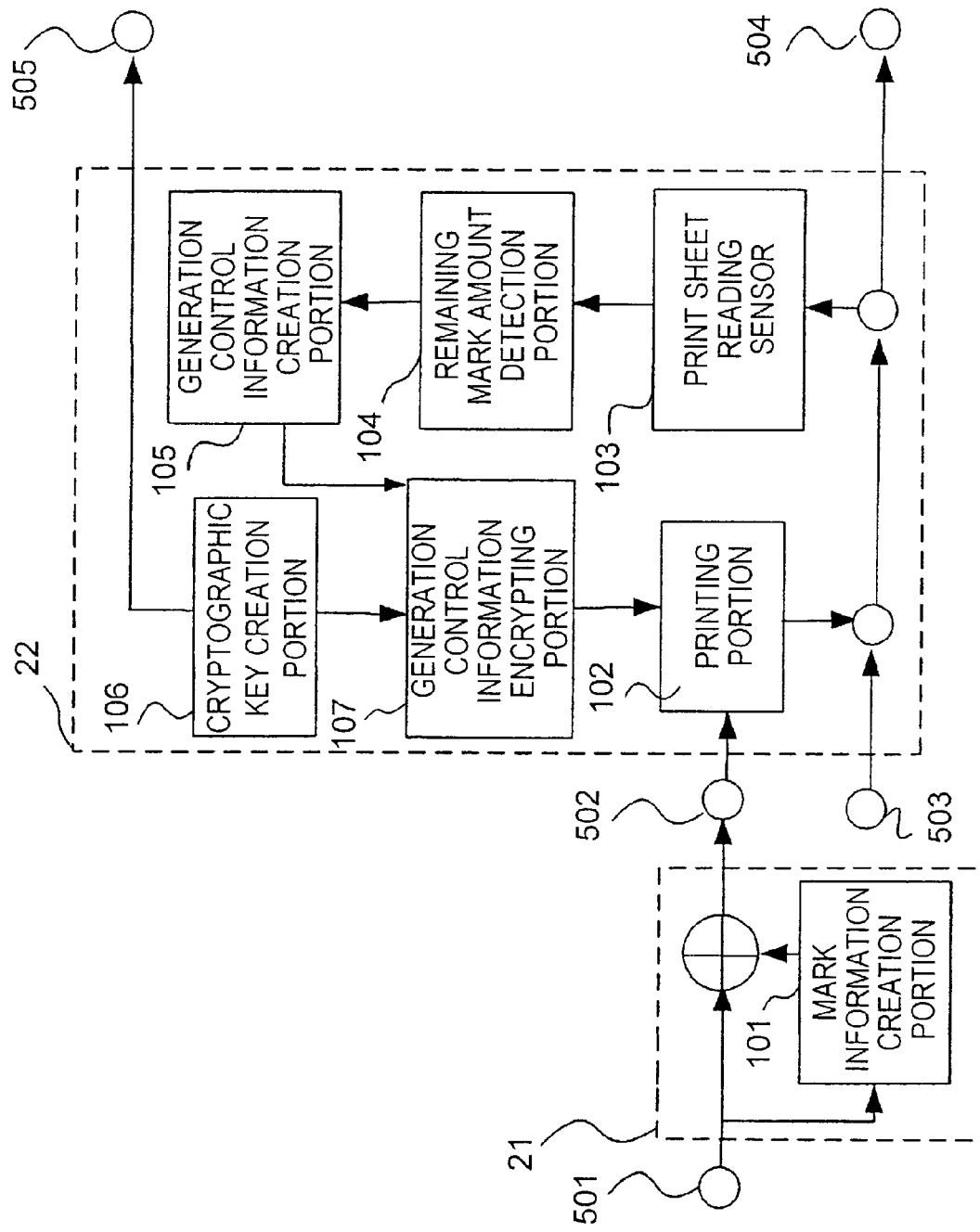
FIG. 7 is a block diagram showing the structure of the printer device of the second embodiment.
Figure 8:
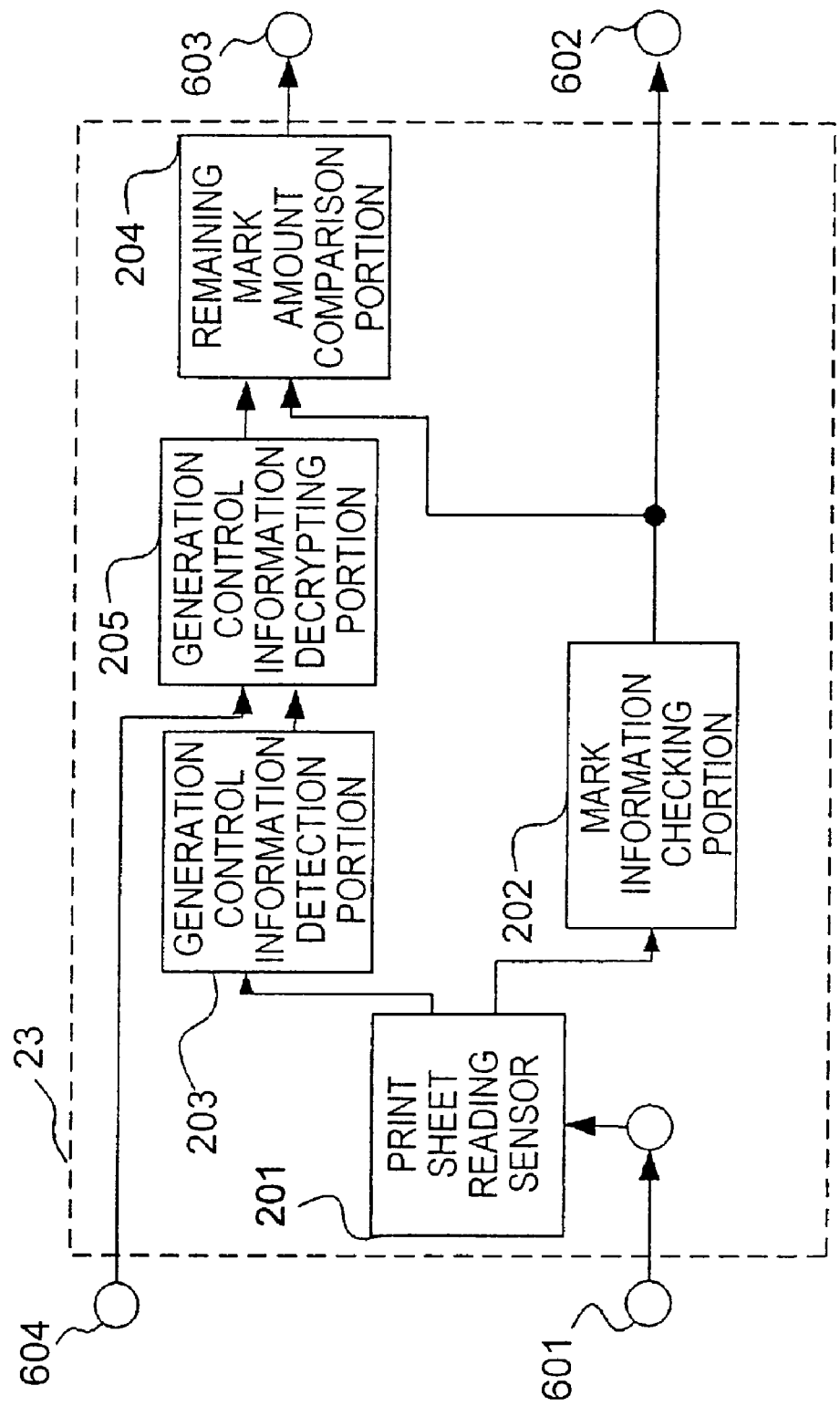
FIG. 8 is a block diagram showing the structure of the checking device of the second embodiment.

The following is a description of the second embodiment of the present invention. FIG. 6 shows the overall structure of the system of the second embodiment. FIG. 7 shows the structure of the printer device of the second embodiment. FIG. 8 shows the structure of the printing device of the second embodiment.

The second embodiment includes the elements described below in addition to those of the first embodiment.

The printing portion 102 does not print the generation control information created at the generation control information creation portion 105 on the print sheet. Instead the generation control information encrypted at the generation control information encrypting portion 107 is printed on the print sheet. The cryptographic key creation portion 106 creates a cryptographic key used for encrypting the generation control information. In addition, the cryptographic key creation portion 106 outputs the cryptographic key which it creates, to the cryptographic key output end 505. The generation control information encrypting portion 107 encrypts the generation control information created at the generation control information creation portion 105 using the cryptographic key created at the cryptographic key creation portion 106.

At the generation control information detection portion 203, the "encrypted" generation control information which is printed on the print sheet is detected. The generation control information decrypting portion 205 decrypts the "encrypted" generation control information input from 203 using the cryptographic key input from the cryptographic key input end 604, and thereby retrieves the generation control information. The cryptographic key created at the printer device is input to the cryptographic key input end 603.

The following is a description of the original authentication system 20 having the structure described in the foregoing.

The print data creation portion 21 operates in the same manner as that of the first embodiment, and thus a description thereof is omitted. The print data having the electronic pattern incorporated therein is output to the print data input end 502.

The printer 22 operates in the following manner.

The print data is input from the print data input end 502, input from the print sheet input end 503, and the operation up until the point where the generation control information is created by the generation control information creation portion 105 is the same as that of the first embodiment.

The cryptographic key is created at the cryptographic key creation portion 106. In this embodiment, an example is one in which the printer creates a cryptographic key for each printing session, from the printer serial number, the time of printing and the like by a using a symmetric cryptographic system. It is to be noted that the present invention is not limited to this example. A method using a known asymmetric cryptographic system, or a method in which the printer device and the checking device are provided with the same cryptographic key in advance may also be used. The cryptographic key created at the cryptographic key creation portion 106 is output to the cryptographic key output end 505 and to the generation control information encrypting portion 107.

The generation control information encrypting portion 107 encrypts the generation control information input from the generation control information portion using the cryptographic key created at the cryptographic key creation portion 106. The generation control information encrypted by the generation control information encrypting portion 107 is printed on the print sheet by the printing portion 102, and the print sheet is output from the print sheet output end 504. The cryptographic key output from the cryptographic key output end 505 is passed on to the checking device 23 by a suitable method. An example of a suggested method is transmission via a network.

The checking device 23 operates in the following manner.

A print sheet is input from the print sheet input end 601, the print sheet reading sensor 201 reads the print data and the operation is the same as that of the first embodiment until the read print data is input to the mark information checking portion 202 and to the generation control information detection portion 203.

At the generation control information detection portion 203, the generation control information in an encrypted state is detected in the print pattern read by the print sheet reading sensor 201, and output to the generation control information decrypting portion 205. On the other hand, the cryptographic key for decrypting the generation control information is input from the cryptographic key input end 604 and passed on to the generation control information decrypting portion 205. The cryptographic key which is passed at this point corresponds to the cryptographic key which encrypted the generation control information of the print sheet which is being checked.

In the generation control information decrypting portion 205, the generation control information is decrypted using the "encrypted" generation control information input from 203 as well as the cryptographic key input from 604. The decrypted generation control information is output to the remaining mark amount comparison portion 204. Subsequent operation is the same as that of the first embodiment.

As described above, according to the second embodiment, in addition to the effect obtained in the first embodiment, the following effect is also obtained. Because the generation control information is encrypted and then printed on the print sheet, it is difficult for a third party to determine the manner in which the generation control information is printed on the print sheet, and thus figuring out the algorithm for calculating the remaining mark amount and the generation control information is difficult.

The Third Embodiment

Figure 9:
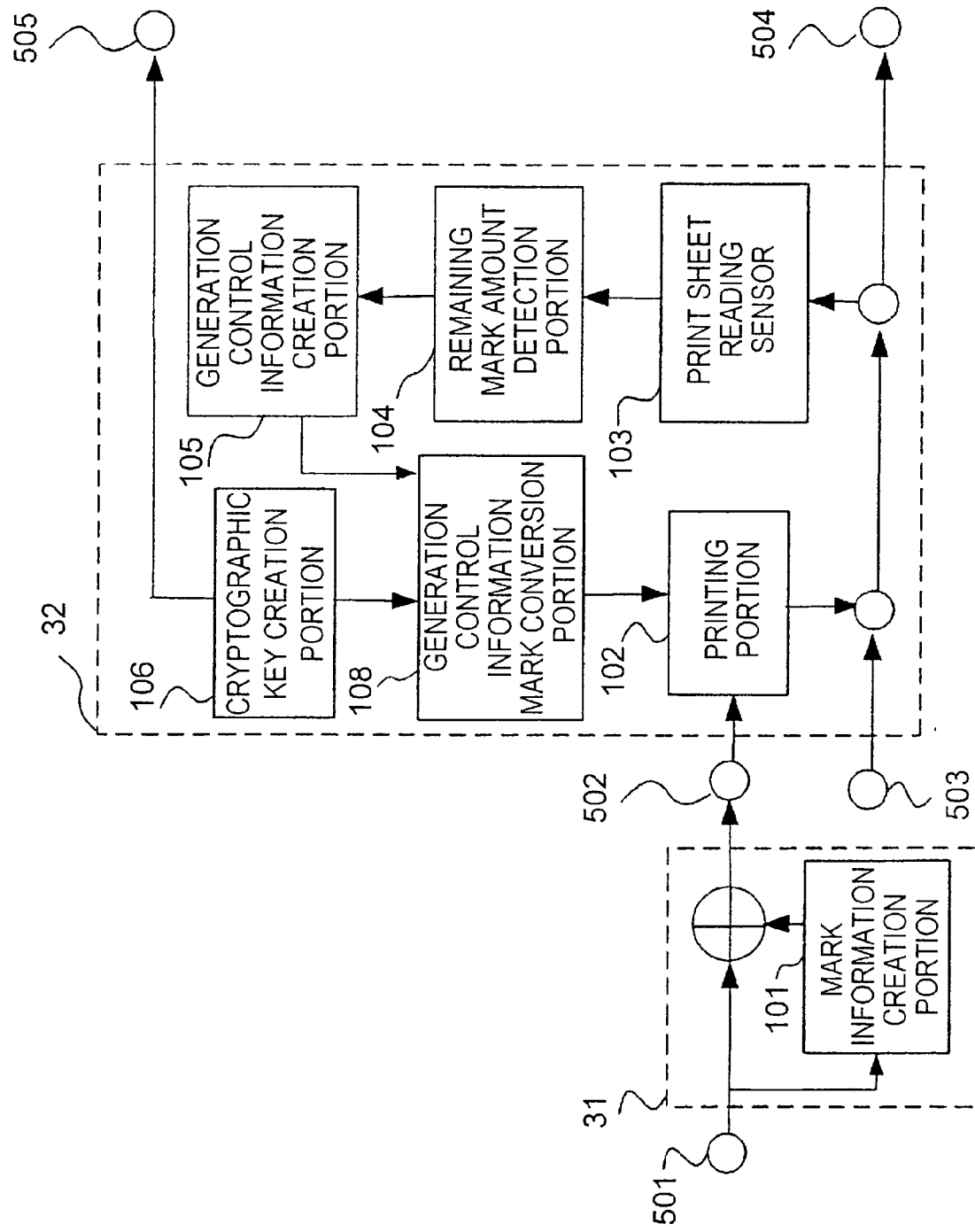
FIG. 9 is a block diagram showing the structure of the printer device of the third embodiment.
Figure 10:
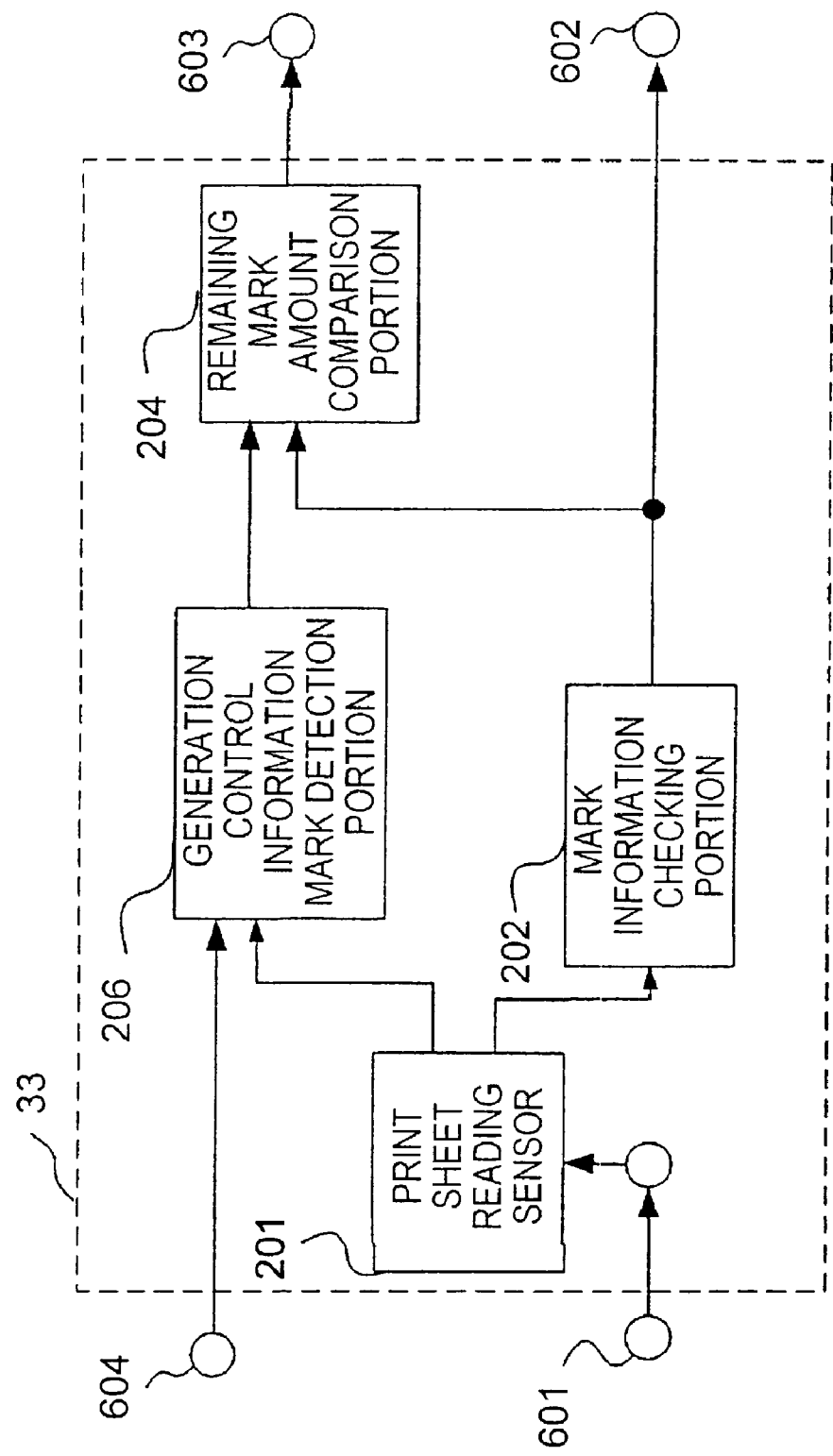
FIG. 10 is a block diagram showing the structure of the checking device of the third embodiment.

The following is a description of the third embodiment of the present invention. FIG. 9 shows the structure of the printer device of the third embodiment. FIG. 10 shows the checking device of the third embodiment.

In addition to those of the first embodiment, the third embodiment includes the following elements.

The printing portion 102 does not print the generation control information created at the generation control information creation portion 105 on the print sheet. Instead the generation control information which was converted to an electronic mark pattern by the generation control information mark conversion portion 108 is printed on the print sheet. The cryptographic key creation portion 106 creates a cryptographic key used for creating the electronic mark pattern for the generation control information. In addition, the cryptographic key creation portion 106 outputs the cryptographic key which it creates, to the cryptographic key output end 505. The cryptographic key used here is preferably a symmetric cryptographic system key since it is to be used for determining the position at which the mark is to be embedded as well as the mark pattern. The generation control information mark conversion portion 108 converts the generation control information created at the generation control information creation portion 105 to an electronic mark pattern using the cryptographic key created at the cryptographic key creation portion 106.

The generation control information mark detection portion 206 converts the generation control information which includes a mark pattern and which was read by the print sheet reading sensor 201, using the cryptographic key input from the cryptographic key input end 604, and thereby obtains the generation control information. The cryptographic key created at the printer device is input to the cryptographic key input end 604.

The following is a description of the original authentication system 30 having the structure described above.

The print data creation portion 31 operates in the same manner as that of the first embodiment and thus a description thereof is omitted. The data having the electronic mark pattern incorporated therein is output to the print data input end 502.

The printer 32 operates in the following manner.

The print data is input from the print data input end 502, then input from the print sheet input end 503, and the operation up until the point where the generation control information is created by the generation control information creation portion 105 is the same as that of the first embodiment.

The cryptographic key is created at the cryptographic key creation portion 106. In this embodiment, one example is one in which the printer creates a cryptographic key for each printing session, from the printer serial number, the time of printing and the like by a using a symmetric cryptographic system. It is to be noted that the present invention is not limited to this example. A method using a known asymmetric cryptographic system, or a method in which the printer device and the checking device are provided with the same cryptographic key in advance may also be used. The cryptographic key created at the cryptographic key creation portion 106 is output to the cryptographic key output end 505 and to the generation control information conversion portion 108.

The generation control information conversion portion 108 converts the generation control information input from the generation control information portion using the cryptographic key created at the cryptographic key creation portion 106. The mark pattern of the generation control information created by the generation control information conversion portion 108 is printed on the print sheet by the printing portion 102, and the print sheet is output by the print sheet output end 504. The cryptographic key output from the cryptographic key output end 505 is passed on to the checking device 23 by a suitable method. An example of a possible method is transmission via a network.

The checking device 33 operates in the following manner.

A print sheet is input from the print sheet input end 601, the print sheet reading sensor 201 reads the print data, and the read data is input to the mark information checking portion 202, and to the generation control information mark checking portion 206. At the generation control information mark checking portion 206, the generation control information which has been converted to a mark pattern from the print pattern read at 201 is detected, and converted to generation control information using the cryptographic key input from 604.

The generation control information obtained at the generation control information mark checking portion 206 is output to the remaining mark amount comparison portion 204. Subsequent operation is the same as that of the first embodiment.

As described in the foregoing, in addition to the effects achieved in the first embodiment, the second embodiment achieves the following effect. It is difficult for a third party to determine whether or not generation control information is printed at positions on the print sheet, such as in the margin region because the generation control information is printed as an electronic mark, and thus figuring out the algorithm for determining the remaining mark amount and the generation control information is difficult.

The Fourth Embodiment

Figure 11:
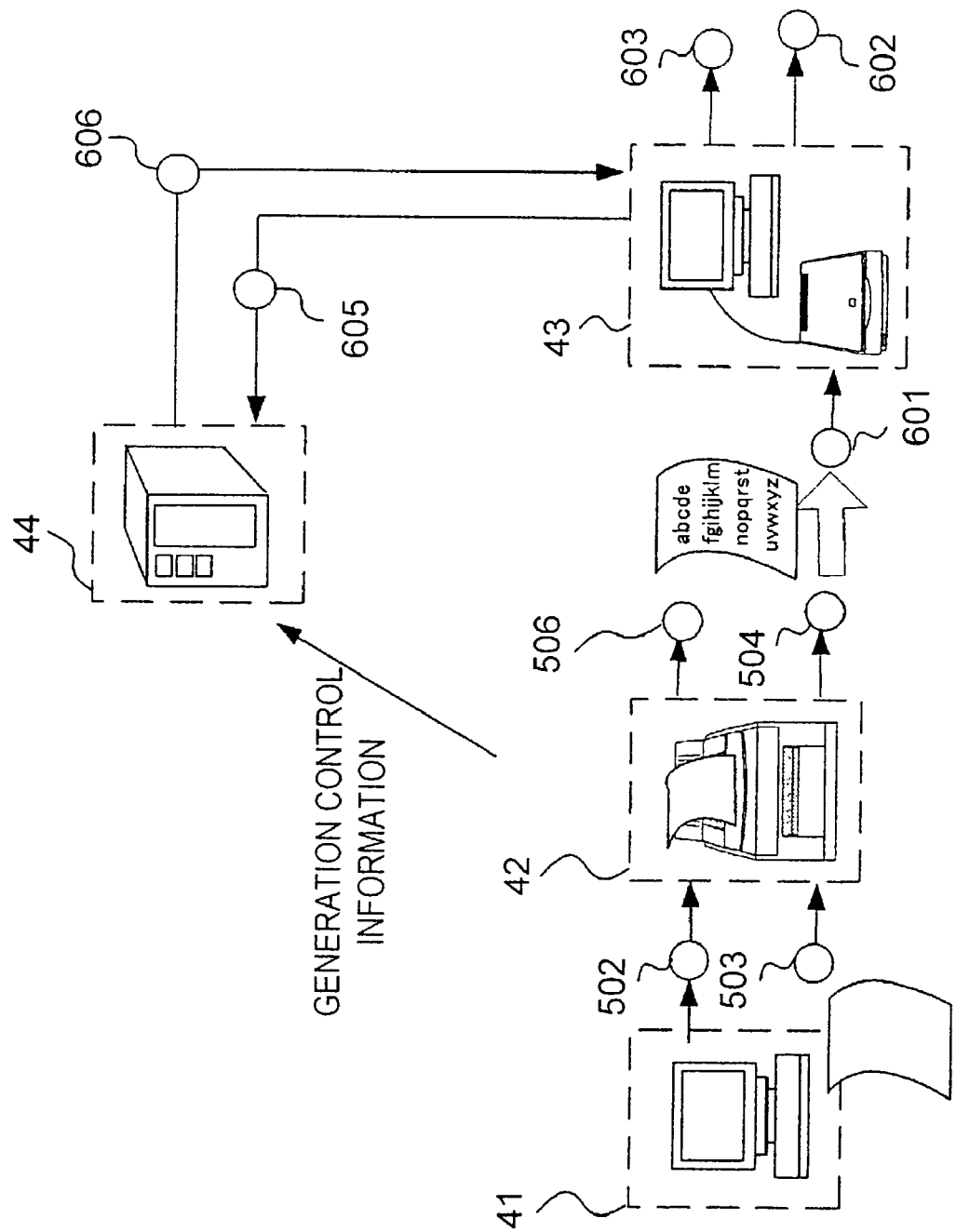
FIG. 11 is a block diagram showing the overall structure of the system of the fourth embodiment.
Figure 12:
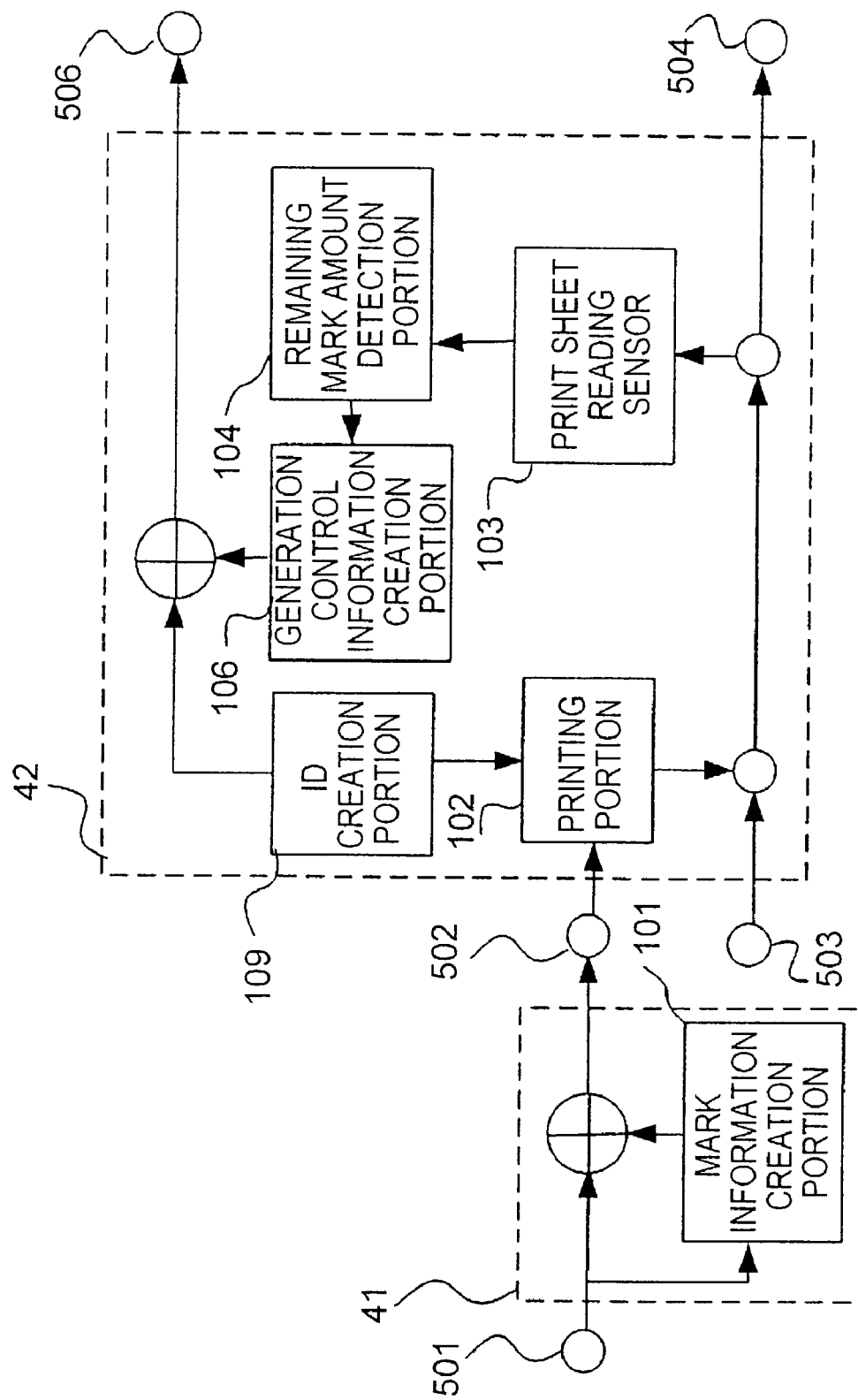
FIG. 12 is a block diagram showing the structure of the printer device of the fourth embodiment.
Figure 13:
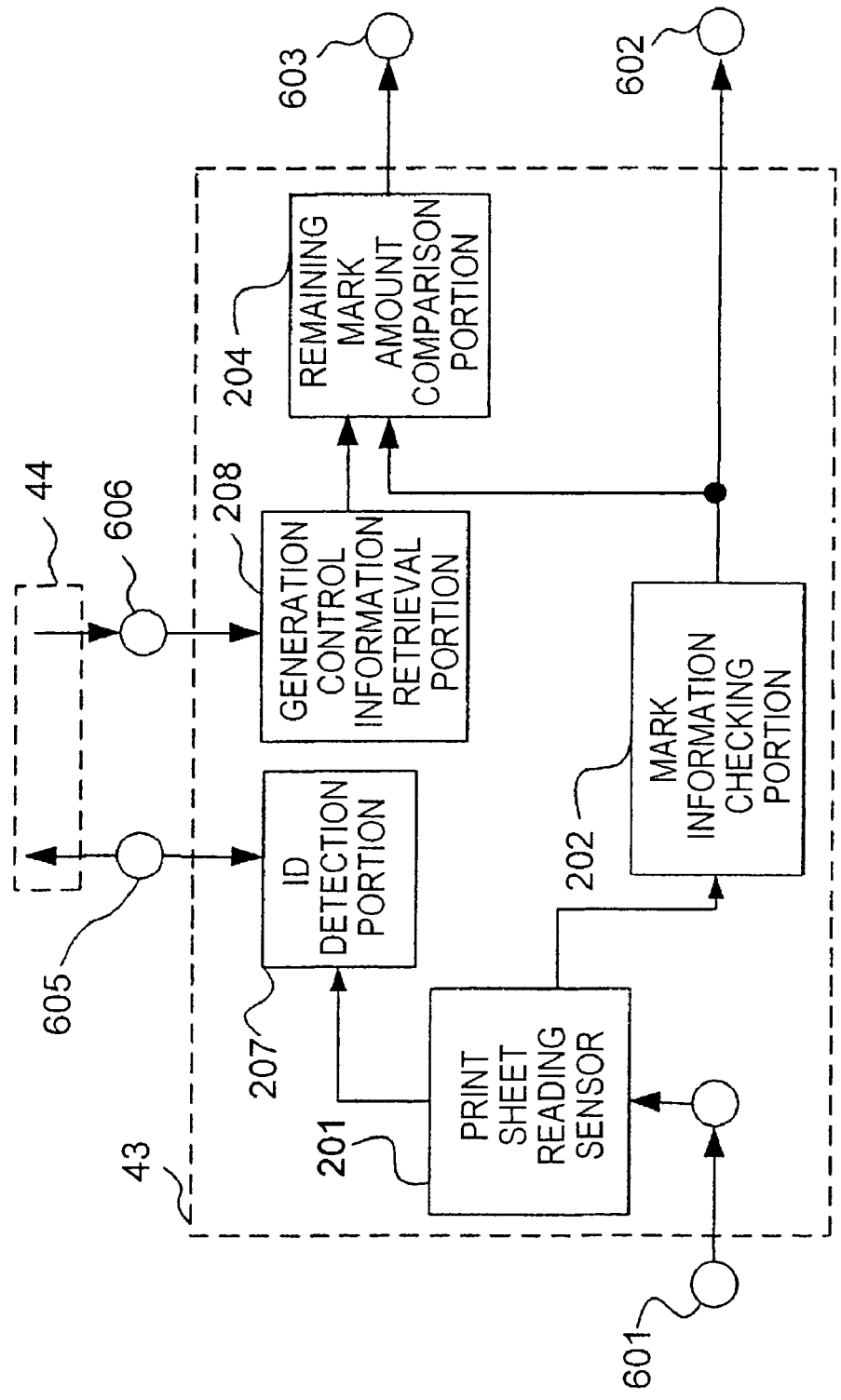
FIG. 13 is a block diagram showing the structure of the checking device of the fourth embodiment.
Figure 14:
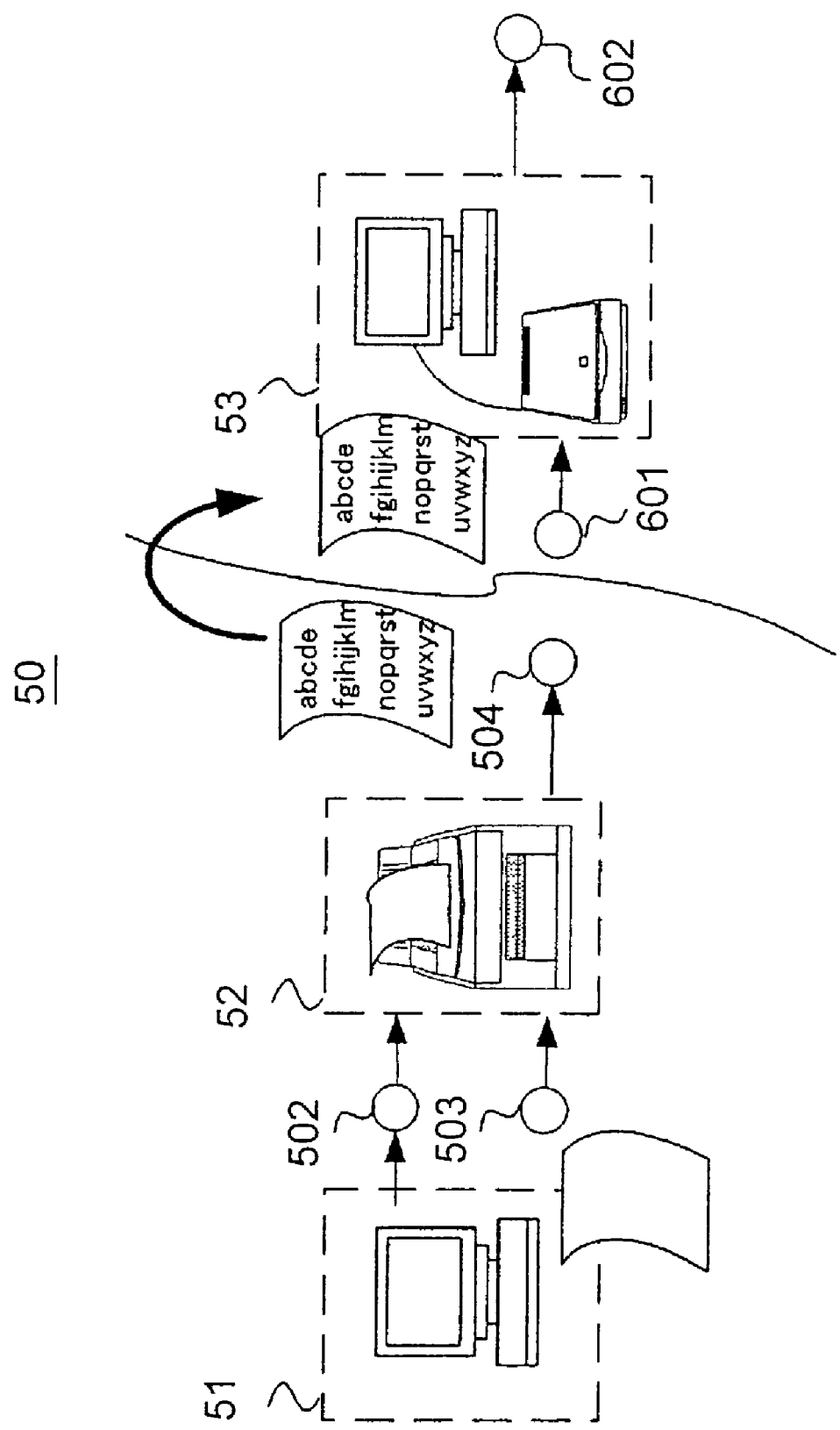
FIG. 14 is a block diagram showing an example of the overall structure of the print sheet original authentication system of the prior art.
Figure 15:
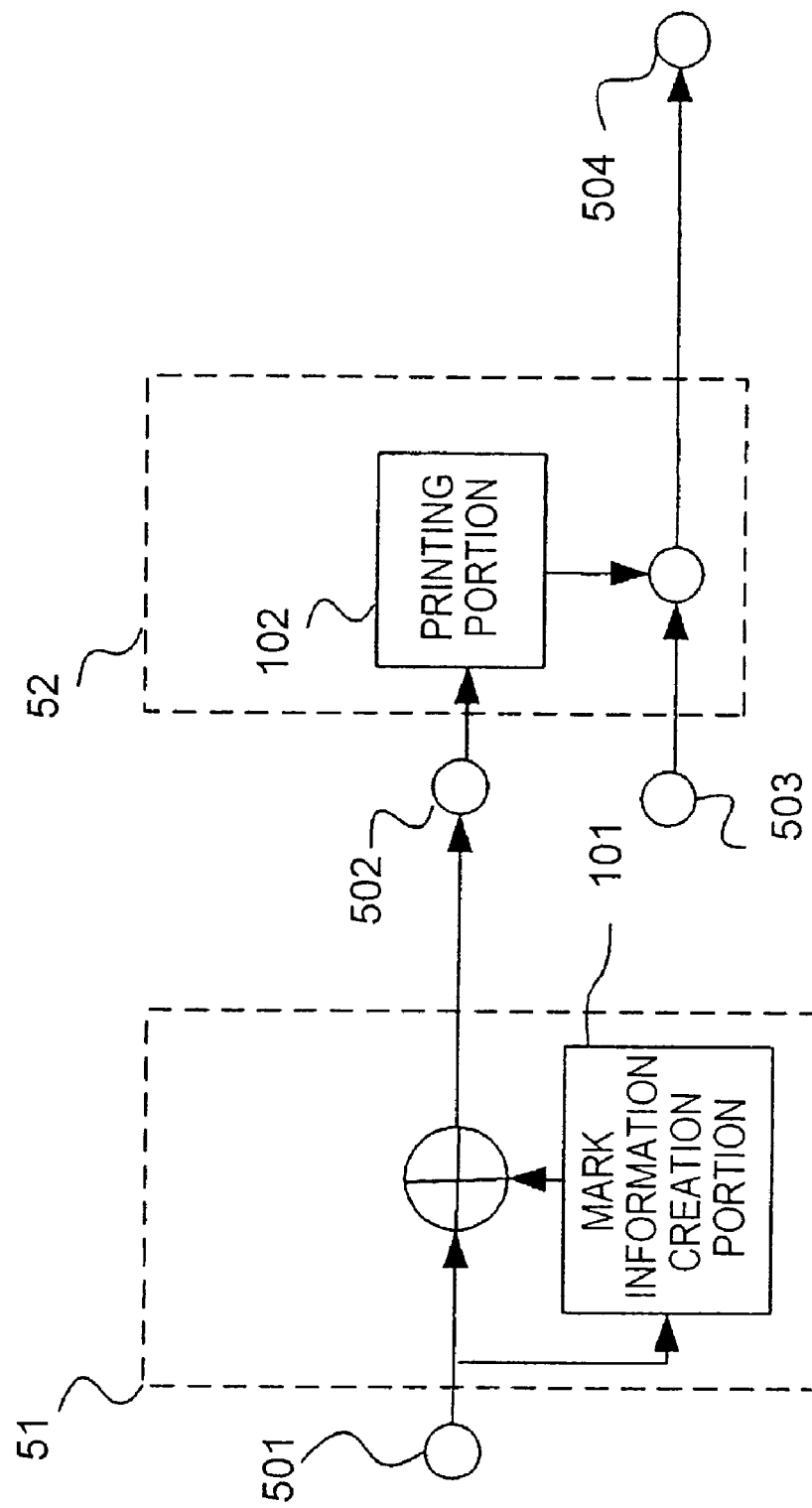
FIG. 15 is a block diagram showing an example of a print pattern creation portion and a printer device of the prior art.
Figure 16:
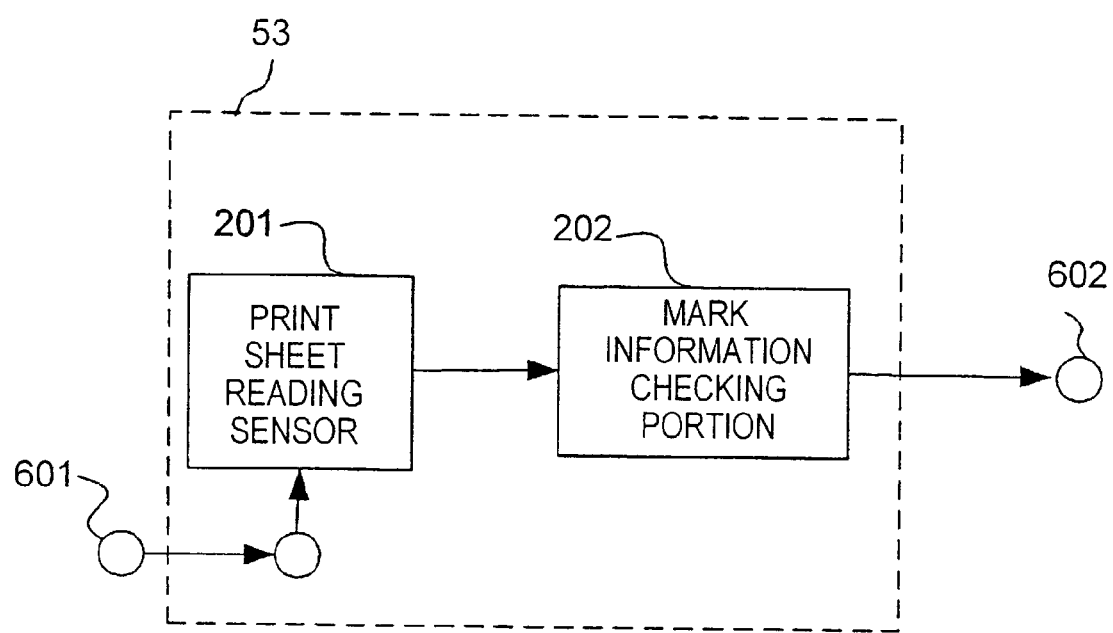
FIG. 16 is a block diagram showing the structure of the checking device of the prior art.

The following is a description of the fourth embodiment. FIG. 11 shows the overall structure of the system of the fourth embodiment. FIG. 12 shows the structure of the printer of the fourth embodiment. FIG. 13 shows the checking device of the fourth embodiment.

The fourth embodiment includes the following elements in addition to those of the first embodiment.

The generation control information server 44 receives and saves the generation control information created at the printer 42, and the sends the generation control information in accordance with requests from the checking device 43.

The generation control information creation portion 105 links the ID created at the ID creation portion 109 with information such as the remaining mark amount and the like, and thereby creates the generation control information.

The ID creation portion 109 creates an ID (serial number or the like) which is specific to each print sheet original.

The ID detection portion 207 detects the ID printed on the print sheet, at the checking device 43. The generation control information retrieval portion 208 sends the ID which was detected at 205 to the generation control information server 44, and retrieves the generation control information corresponding to this ID. The generation control information output end 506 sends the generation control information created at the printer 42 to the generation control information server 44. The ID transmission end 605 sends the ID detected on the print sheet at the ID detection portion 207 to the generation control information server 44, and then requests the generation control information corresponding to the ID. The generation control information receiving end 606 receives the generation control information corresponding to the ID sent at the ID transmission end 605 from the generation control information server 44.

The following is a description of the original authentication system 40 having the structure described above.

The print data creation portion 41 operates in the same manner as that in the example of the prior art, and therefore a description thereof is omitted. The print data having an electronic marking pattern incorporated therein is output to the print data input end 502.

The printer device 42 operates in the following manner.

The print data is input from the print data input end 502, then input from the print sheet input end 503, and the operation up until the generation control information is created by the generation control information creation portion 105 is the same as that of the first embodiment.

The ID creation portion 109 creates a unique ID for each print sheet. The ID may be created from the printer serial number, or from the date and time of printing or the like. Further, at least within a system connected to the same generation control information server, the ID must be created such that originals never have the same ID. The ID created at the ID creation portion 109 is input to the printing portion 102 and printed on the print sheet.

Further, the generation control information created at the 105 is linked to the ID created at the ID creation portion 109 and output to the generation control information output end 506. The generation control information output from the generation control information output end 506 is passed on to the generation control information server by a suitably selected method. An example of such a method is transmission via a network.

The generation control information server 44 saves generation control information output from the generation control information output end 506 of the printer device 42. When the generation control information is required from the checking device 43, the generation control information server 44 acquires ID information from the checking device 43 to send generation control information corresponding thereto to the checking device 43.

The checking device 43 operates in the following manner.

A print sheet is input from the print sheet input end 601, the print sheet reading sensor 201 reads the print data, and the read data is input to the mark information checking portion 202, and to the ID detection portion 207. At the mark information checking portion 202, checking of electronic mark pattern of the print data is carried out and the remaining mark amount is calculated. At the ID detection portion 207, the ID set for that print sheet is detected and sent from the ID transmission end 605 to the generation control information server 44.

The generation control information server 44 sends the generation control information corresponding to the ID sent from the checking device back to the checking device. The generation control information receiving end 606 receives the generation control information from the generation control information server 44 and inputs it to the generation control information retrieval portion 208. The generation control information retrieval portion 208 extracts the remaining mark amount from the generation control information and outputs it to the remaining mark amount comparison portion 204. The remaining mark amount obtained at the mark information checking portion 202 and that obtained at the generation control information retrieval portion 208 are sent to the remaining mark amount comparison portion 204 to be compared.

At the remaining mark amount comparison portion 204:

(a) If the difference between the two remaining mark amounts is not greater than a specific threshold value, the print sheet is determined to be an original, and this result is output to the generation control information check result output end 603.

(b) If the difference between the two remaining mark amounts exceeds a specific threshold value, the print sheet is determined to be a copy and not an original, and this result is output to the generation control information check result output end 603.

In addition, at the mark information checking portion 202, any result obtained by checking the mark, other than the determination as to whether or not the print sheet is an original, is output to the mark check result output end 602.

As described above, in this embodiment, in addition to the effects obtained by the first to third embodiments, the following effect is also achieved. Since the remaining mark amount is recorded on the print sheet itself, it is difficult to figure out the algorithm for calculating the remaining mark amount without comparing the relationship between the actual print state and the remaining mark amount at that time.

The preferred embodiments of the original authentication system, the printer device, and the checking device of the present invention have been described with reference to the accompanying drawings. However these examples are not intended for the purpose of limiting the present invention thereto. As such, the invention is not limited to only the above described embodiments. Rather, it is recognized that one skilled in the art could conceive of alternative embodiments that fall within the scope of the invention.

For example, in the first embodiment, printing a barcode was given as an example of the print pattern of the generation control information. However, various patterns such as a two dimensional barcode, a mark, a numerical value or the like may be used.

Also, in the first embodiment, an example was described in which the print sheet was conveyed in only one direction and the generation control information was printed in the margin region thereof. However, by changing the position of the print reading sensor, the generation control information may be printed at a suitably selected location of the print sheet (for example, at the header region, on the entire surface of the print sheet, or on the back surface).

In addition, in the fourth embodiment, the generation control information was stored at the generation control information server. However, the generation control information may be sent directly from the printer device to the checking device without going via an external server.

Further, in the fourth embodiment an ID is printed on the print sheet instead of the generation control information. However, the method for printing the ID which is used may be the method of the second embodiment in which encrypting is carried out before printing, or alternatively, the method of the third embodiment in which an electronic pattern is printed.

As described above, according to the present invention, it is possible to distinguish between deterioration occurring when an original is first printed out and that occurring when subsequent copies are made, and thus it is possible to determine if a print sheet on which printing has been carried out is an original or a copy (that is, it is possible to distinguish between an original and a copy).

What is claimed is:

1. A print sheet original authentication system comprising:

a print data creation portion for creating print data having an electronic mark added to the original data; a printer device for printing the print data on a print sheet as a print pattern; and a checking device for checking for the mark on the print sheet; wherein:

(a) the printer device comprises:

a print sheet reading sensor for reading the print pattern on a print sheet on which printing has been carried out;

a remaining mark amount detection portion for detecting the remaining mark amount from a print pattern of a read print sheet;

a generation control information creation portion for converting the remaining mark amount to generation control information;

a printing portion for printing the generation control information on the print sheet;

a cryptographic key creation portion for creating a cryptographic key used for encrypting the generation control information;

a generation control information encrypting portion for encrypting the generation control information using the cryptographic key; and a cryptographic key output end for outputting the cryptographic key to the checking device; and (b) the checking device comprises:

a print sheet reading sensor for reading the print pattern of the input print sheet;

a mark information checking portion for detecting the mark information on the print pattern of the read print sheet, checking the electronic mark and calculating the remaining mark amount;

generation control information detection portion for detecting the generation control information of the print pattern of the read print sheet, and extracting the remaining mark amount from said generation control information;

a remaining mark amount comparison portion for comparing the calculated remaining mark amount obtained by mark detection with the remaining mark amount extracted from the generation control information;

a cryptographic key input end which inputs the cryptographic key; and a generation control information decrypting portion which decrypts the encrypted generation control information.

2. A print sheet original authentication system comprising:

a print data creation portion for creating print data having an electronic mark incorporated in the original data; a printer device for printing the print data on a print sheet as a print pattern; and a checking device for checking for the mark on the print sheet;

(a) wherein the printer device comprises:

a print sheet reading sensor for reading the print pattern on a print sheet on which printing has been carried out;

a remaining mark amount detection portion for detecting the remaining mark amount from a print pattern of a read print sheet;

a generation control information creation portion for converting the remaining mark amount to generation control information;

a cryptographic key creation portion which creates a cryptographic key used for converting the generation control information to an electronic mark pattern;

a generation control information mark conversion portion for converting the generation control information to an electronic mark pattern using the cryptographic key; and a cryptographic key output end which outputs the cryptographic key to the checking device; and a printing portion for printing the generation control information on the print sheet;

(b) wherein the checking device comprises:

a print sheet reading sensor for reading the print pattern of the input print sheet;

a mark information checking portion for detecting the mark information on the print pattern of the read print sheet, checking the electronic mark and calculating the remaining mark amount;

generation control information detection portion for detecting the generation control information of the print pattern of the read print sheet, and extracting the remaining mark amount from said generation control information;

a remaining mark amount comparison portion for comparing the calculated remaining mark amount obtained by mark detection with the remaining mark amount extracted from the generation control information;

a cryptographic key input end which inputs the cryptographic key; and a generation control information detection portion which detects the generation control information read as the electronic mark pattern using the cryptographic key and extracts the recorded remaining mark amount.

3. A print sheet original authentication system comprising:

a print data creation portion which creates print data having electronic mark information incorporated in the original data; a printer device which prints the print data on a print sheet as a print pattern; a checking device which checks the mark on the print sheet; and a generation control information server for sending and receiving the generation control information of the print sheet between the printer device and the checking device wherein, the printer device detects the remaining mark amount of the print pattern on the print sheet which was read, and converts the remaining mark amount to generation control information; and links a unique ID for the print sheet with the generation control information and outputs them to an external server; and the generation control information server links the ID and the generation control information and stores them; and the checking device calculates the remaining mark amount of the print pattern on the print sheet which was read, and also detects the ID and retrieves the generation control information from the external server, then extracts the remaining mark amount from the generation control information; and compares the calculated remaining mark amount with the remaining mark amount extracted from the generation control information.

4. A print sheet original authentication system comprising:

a print data creation portion which creates print data having electronic mark information incorporated in the original data; a printer device which prints the print data on a print sheet as a print pattern; a checking device which checks the mark on the print sheet; and a generation control information server for sending and receiving the generation control information of the print sheet between the printer device and the checking device wherein:

the printer device comprises:

a print sheet reading sensor for reading the print pattern on a print sheet on which printing has been carried out;

a remaining mark amount detection portion for detecting the remaining mark amount from a print pattern of a read print sheet;

a generation control information creation portion for converting the remaining mark amount to generation control information;

an ID creation portion for creating a unique ID for each print sheet;

a printing portion for printing the ID on the print sheet;

a generation control information output end for linking the ID and the generation control information and outputting them to the generation control information server; and the generation control information server links the ID and the generation control information and stores them; and the checking device comprises:

a print sheet reading sensor for reading the print pattern of the input print sheet;

a mark information checking portion for detecting the mark information from the print pattern of the read print sheet, checking the electronic mark and calculating the remaining mark amount;

an ID detection portion for detecting the ID from the print pattern read by the print sheet reading sensor;

an ID transmission end for sending the detected ID to the generation control information server and for requesting retrieval of the generation control information;

a generation control information receiving end for receiving the generation control information corresponding to the ID sent from the generation control information server;

a generation control information retrieval portion for extracting the remaining mark amount from the retrieved generation control information; and a remaining mark amount comparison portion for comparing the calculated remaining mark amount obtained by mark detection with the remaining mark amount extracted from the generation control information.

5. A checking device for carrying out mark checking of a print sheet having printed as a print pattern thereon, print data having an electronic mark incorporated in the original data and a unique ID for each print sheet, the checking device comprising:

a print sheet reading sensor for reading the print pattern of the input print sheet;

a mark information checking portion for detecting the mark information from the print pattern of the read print sheet, for checking the electronic mark and for calculating the remaining mark amount;

an ID detection portion for detecting the ID of the print pattern read by the print sheet reading sensor;

an ID transmission end for sending the detected ID to an external server and for requesting retrieval of the generation control information;

a generation control information receiving end for receiving the generation control information corresponding to the ID sent from the external server;

a generation control information retrieval portion for extracting the remaining mark amount from the retrieved generation control information; and a remaining mark amount comparison portion for comparing the calculated remaining mark amount obtained by mark detection with the remaining mark amount extracted from the generation control information.

* * * * *